(12) United States Patent
Seven et al.

(10) Patent No.: US 10,162,141 B1
(45) Date of Patent: Dec. 25, 2018

(54) FLOODING COMPOSITION WITH POLYSILOXANE

(71) Applicant: Dow Global Technologies LLC, Midland, MI (US)

(72) Inventors: Karl M. Seven, Auburn, PA (US); Jeffrey M. Cogen, Flemington, NJ (US); Mohamed Esseghir, Lawrenceville, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/938,885

(22) Filed: Mar. 28, 2018

(51) Int. Cl.
*G02B 6/44* (2006.01)
*C08L 51/08* (2006.01)
*C08L 51/06* (2006.01)

(52) U.S. Cl.
CPC .......... *G02B 6/4401* (2013.01); *C08L 51/085* (2013.01); *G02B 6/4494* (2013.01); *C08L 51/06* (2013.01); *C08L 2203/12* (2013.01); *C08L 2205/02* (2013.01); *C08L 2205/035* (2013.01)

(58) Field of Classification Search
CPC .... C08L 51/085; C08L 83/04; C08L 2203/12; C08L 2203/18; C08L 2203/20; C08L 2205/035
USPC .......................................... 385/109; 523/173
See application file for complete search history.

(56) References Cited

U.S. PATENT DOCUMENTS

| 4,356,342 | A | | 10/1982 | Verne | |
|---|---|---|---|---|---|
| 4,978,694 | A | * | 12/1990 | Vincent | C08L 83/04 523/173 |
| 5,130,041 | A | | 7/1992 | Groenhof | |
| 5,246,783 | A | | 9/1993 | Spenadel et al. | |
| 5,357,020 | A | * | 10/1994 | Cogen | C08G 77/14 528/27 |
| 5,880,210 | A | * | 3/1999 | Schulz, Jr. | A61K 8/042 524/261 |
| 5,902,849 | A | * | 5/1999 | Heucher | C08L 53/025 523/173 |
| 5,911,023 | A | * | 6/1999 | Risch | G02B 6/4401 385/100 |
| 6,085,009 | A | * | 7/2000 | Risch | G02B 6/4494 385/109 |
| 6,496,629 | B2 | | 12/2002 | Ma et al. | |
| 6,714,707 | B2 | | 3/2004 | Rossi et al. | |
| 7,863,361 | B2 | | 1/2011 | Falk et al. | |
| 9,272,469 | B2 | | 3/2016 | Esseghir et al. | |
| 9,345,148 | B2 | | 5/2016 | Pendse | |
| 9,387,625 | B2 | | 7/2016 | Esseghir et al. | |
| 9,394,442 | B2 | | 7/2016 | Adams et al. | |
| 2012/0283346 | A1 | * | 11/2012 | Backer | C08F 255/02 521/134 |
| 2016/0184210 | A1 | | 6/2016 | Clark et al. | |
| 2018/0009951 | A1 | | 1/2018 | Gubbels et al. | |

* cited by examiner

*Primary Examiner* — Robert Tavlykaev
(74) *Attorney, Agent, or Firm* — Husch Blackwell LLP

(57) ABSTRACT

The present disclosure provides a flooding composition. In an embodiment, the flooding composition includes in weight percent (wt %) based on the weight of the composition (A) from 10 wt % to 45 wt % of a silane-grafted polyolefin (Si-g-PO). The flooding composition also includes (B) from 5 wt % to 60 wt % of a polyα-olefin oil (PAO oil), (C) from 15 wt % to 90 wt % of a polysiloxane, and (D) from 0.05 wt % to 0.2 wt % of a catalyst.

14 Claims, 1 Drawing Sheet

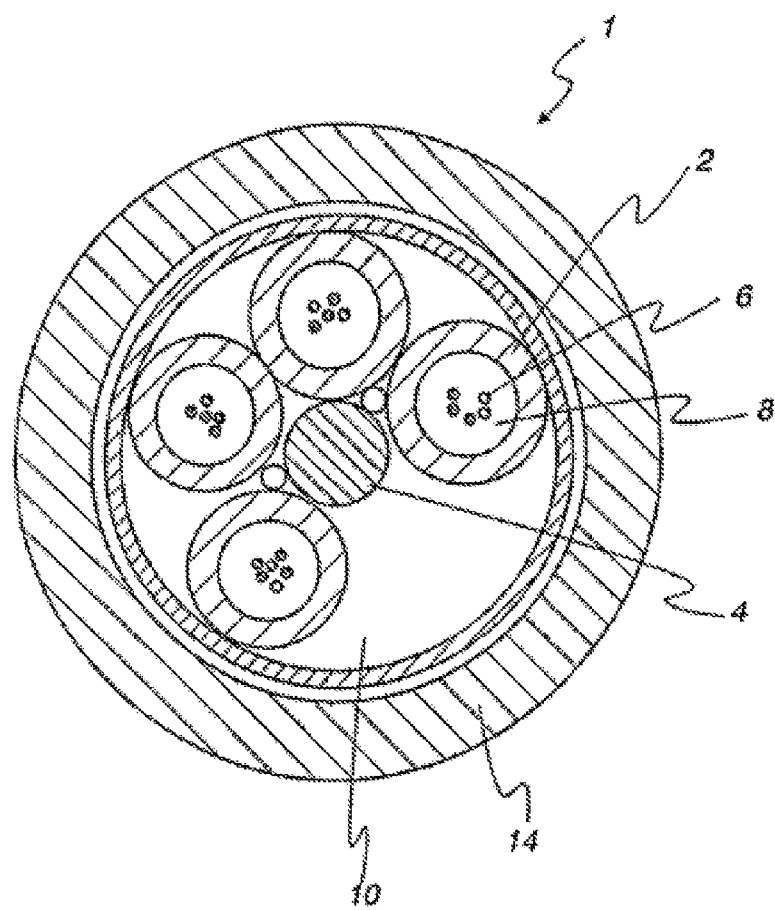

US 10,162,141 B1

FLOODING COMPOSITION WITH POLYSILOXANE

BACKGROUND

Flooding compositions are materials designed to occupy void spaces in telecommunication cables, such as the void spaces typically found around and between buffer tubes commonly used in fiber optic cables. Additionally, flooding compositions can be used as filling materials to suspend and protect optical fibers inside buffer tubes. Flooding compositions are free-flowing at elevated temperatures (such as those temperatures used when filling a telecommunication cable), and readily gel at lower temperatures to avoid dripping at room temperature. Additionally, easy-to-clean and non-messy flooding compositions are desirable for ease of installation and prevention of environmental contamination. Although advances have been made in the art of flooding compounds, improvements are still desired.

Another important property of a flooding composition is its compatibility with polymer materials used in cable constructions such as polyolefin, i.e., low gel pickup for good property retention and cable longevity. Current commercial flooding compounds are based on synthetic hydrocarbons; they are messy, grease/wax-like materials that stick to surfaces that come in contact with them. In case of a spill, they are not environmentally friendly. The wire and cable industry has a continuing interest in flooding compositions that exhibit reduced stickiness, reduced absorption into materials used in the manufacture of cable components such as buffer tubes, jackets, etc., and more environmental friendly.

SUMMARY

The present disclosure provides a flooding composition. In an embodiment, the flooding composition includes in weight percent (wt %) based on the weight of the composition (A) from 10 wt % to 45 wt % of a silane-grafted polyolefin (Si-g-PO). The flooding composition also includes (B) from 5 wt % to 60 wt % of a polyα-olefin oil (PAO oil), (C) from 15 wt % to 90 wt % of a polysiloxane, and (D) from 0.05 wt % to 0.2 wt % of a catalyst.

BRIEF DESCRIPTION OF THE DRAWINGS

FIG. 1 is a cross-sectional view of a loose buffer tube fiber optic cable.

DEFINITIONS

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

Any reference to the Periodic Table of Elements is that as published by CRC Press, Inc., 1990-1991. Reference to a group of elements in this table is by the new notation for numbering groups.

Unless stated to the contrary, implicit from the context, or customary in the art, all parts and percents are based on weight and all test methods are current as of the filing date of this disclosure.

The numerical ranges in this disclosure include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

"Bio-based fluid" and like terms is a fluid derived from a biological source, such as a plant, animal, bacteria, yeast, algae, and the like. Bio-based fluids can include a single bio-based fluid, i.e., a fluid derived from a single biological source, or a blend of two or more bio-based fluids, i.e., a fluid derived from two or more biological sources. Bio-based fluids are liquid under ambient conditions (23° C. and atmospheric pressure), or have a wax-like consistency under ambient conditions (23° C. and atmospheric pressure) and become liquid upon heating.

"Cable," and "power cable" and like terms refer to at least one wire or optical fiber within a sheath, e.g., an insulation covering or a protective outer jacket. Typically, a cable is two or more wires or optical fibers bound together, typically in a common insulation covering and/or a protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783; 6,496,629 and 6,714,707.

"Composition" and like terms is a mixture or blend of two or more components.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Ethylene-based polymer," "polyethylene" and like terms refer to a polymer containing units derived from ethylene. Ethylene-based polymer contain more than 50 mole percent (mol %) units derived from ethylene.

An "olefin-based polymer," or "polyolefin" is a polymer that contains a majority mole percent polymerized olefin monomer (based on total amount of polymerizable monomers), and optionally, may contain at least one comonomer. Nonlimiting examples of olefin-based polymers include ethylene-based polymer and propylene-based polymer.

A "propylene-based polymer" is a polymer that contains more than 50 mole percent polymerized propylene monomer (based on the total amount of polymerizable monomers) and, optionally, may contain at least one comonomer.

"Residue," when referring to a monomer, refers to that portion of a monomer molecule which resides in a polymer molecule as a result of being polymerized with another monomer or comonomer molecule to make the polymer molecule.

"Wire" and like terms refers to a single strand of conductive metal, e.g., copper or aluminum, or a single strand of optical fiber.

Test Methods

Density

Density is determined according to ASTM D792 with results reported in grams per cubic centimeter, (g/cc).

Differential Scanning Calorimetry (Crystallinity, Melting Point, Crystallization Temperature)

Differential Scanning calorimetry ("DSC") is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for polyethylene (or "PE") (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)× 100 (for PE)).

Unless otherwise stated, melting point(s) ($T_m$) of each polymer is determined from the second heat curve (peak Tm), and the crystallization temperature ($T_c$) is determined from the first cooling curve (peak Tc). Glass transition temperature, Tg, is determined from the DSC heating curve where half the sample has gained the liquid heat capacity as described in Bernhard Wunderlich, The Basis of Thermal Analysis, in Thermal Characterization of Polymeric Materials 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Drop Point

Drop point is determined according to ASTM D127 with results reported in degrees Celsius (° C.).

Flash point refers to the lowest temperature at which a volatile liquid can vaporize to form an ignitable mixture in air but will not continue to burn (compare to fire point). Flash point is measured in accordance with ASTM D3278 with results reported in degrees Celsius (° C.).

Gel Permeation Chromatography

A high-temperature gel permeation chromatography ("GPC") system is employed, equipped with Robotic Assistant Deliver ("RAD") system for sample preparation and sample injection. The concentration detector is an Infra-red detector (IR4) from Polymer Char Inc. (Valencia, Spain). Data collection is performed using Polymer Char DM 100 Data acquisition box. The carrier solvent is 1,2,4-trichlorobenzene ("TCB"). The system is equipped with an on-line solvent degas device from Agilent. The column compartment is operated at 150° C. The columns are four Mixed A LS 30-cm, 20-micron columns. The solvent is nitrogen-purged TCB containing approximately 200 ppm 2,6-di-t-butyl-4-methylphenol ("BHT"). The flow rate is 1.0 mL/min, and the injection volume is 200 microliters (µl). A 2 mg/mL sample concentration is prepared by dissolving the sample in nitrogen-purged and preheated TCB (containing 200 ppm BHT) for 2.5 hours at 160° C. with gentle agitation.

The GPC column set is calibrated by running twenty narrow molecular weight distribution polystyrene ("PS") standards. The molecular weight ("MW") of the standards ranges from 580 to 8,400,000 g/mol, and the standards are contained in six "cocktail" mixtures. Each standard mixture has at least a decade of separation between individual molecular weights. The equivalent polypropylene ("PP") molecular weights of each PS standard are calculated by using the following equation, with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left( \frac{K_{PS} M_{PS}^{a_{PS}+1}}{K_{PP}} \right)^{\frac{1}{a_{PP}+1}}, \quad (Eq\ 1)$$

where $M_{PP}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$M_n = \frac{\sum_i Wf_i}{\sum_i \left(\frac{Wf_i}{M_i}\right)}, \quad (Eq\ 2)$$

$$M_w = \frac{\sum_i (Wf_i * M_i)}{\sum_i (Wf_i)}, \quad (Eq\ 3)$$

where $Wf_i$ and $M_i$ are the weight fraction and molecular weight of elution component i, respectively.

Melt Index

Melt index, or $I_2$, is measured in accordance with ASTM D1238, condition 190° C./2.16 kg, and is reported in grams eluted per 10 minutes (g/10 min). The $I_{10}$ is measured in accordance with ASTM D1238, condition 190° C./10 kg, and is reported in grams eluted per 10 minutes (g/10 min).

Melt Flow Rate

Melt flow rate (MFR) in g/10 min is measured in accordance with ASTM D1238 (230° C./2.16 kg).

Viscosity

Apparent viscosity for the flooding composition is determined according to ASTM D3236 at 150° C. and is reported in centipoise (cP). Kinematic viscosity can be calculated by using apparent viscosity divided by fluid density. Kinematic viscosity is reported in Stokes (St) or centiStokes (cSt).

Brookfield viscosity of polymer components (i.e., polyolefin elastomers) is determined in accordance with the following procedure using a Brookfield Laboratories DVII+ Viscometer in disposable aluminum sample chambers. The spindle used is an SC-31 hot-melt spindle, suitable for measuring viscosities in the range of from 10 to 100,000 centipoise (0.1 to 1,000 grams/(cm·second)). A cutting blade is employed to cut samples into pieces small enough to fit into the 1-inch wide, 5-inches long (2.5-cm wide, 13-cm long) sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. Based on the material to be tested, the sample is heated to a target temperature, typically 150° C., or 176° C., or 176.6° C., or 177° C., or 190° C. (other temperatures may be used), with additional sample being added until the melted sample is about 1 inch (2.5 cm) below the top of the sample chamber. The viscometer apparatus is lowered and the spindle submerged into the sample chamber. Lowering is continued until brackets on the viscometer align on the Thermosel. The viscometer is turned on and set to a shear rate, which leads to a torque reading in the range of 30 to 60 percent. Readings are taken every minute for about 15 minutes, or until the values stabilize, then the final reading is recorded.

Oil Separation

After mixing the samples as described above, 50 milliliters (ml) of the melted sample is poured into a shallow aluminum pan and the sample is allowed to cool and solidify. Any oil separation will be visible on the surface after sitting for 24 hours at room temperature and the result is recorded.

Pour point refers to the lowest temperature at which a liquid becomes semi-solid and loses its flow characteristics, or in other words, the minimum temperature at which a liquid will flow. Pour point is measured in accordance with ASTM D97 with results reported in degrees Celsius (° C.).

DETAILED DESCRIPTION

The present disclosure provides a flooding composition. In an embodiment, the flooding composition includes (A) from 10 wt % to 45 wt % of a silane-grafted polyolefin. The flooding composition also includes (B) from 5 wt % to 60 wt % of a polyα-olefin oil. The flooding composition also includes (C) from 15 wt % to 90 wt % of a polysiloxane and (D) from 0.05 wt % to 2.0 wt % of a catalyst. The aggregate of components (A), (B), (C), and (D) amount to 100 wt % of the flooding composition.

A. Silane-Grafted Polyolefin

The present flooding composition includes a silane-grafted polyolefin. The silane-grafted polyolefin (or "Si-g-PO") is formed by grafting a hydrolysable silane monomer (such as a vinyl silane monomer) onto the backbone of one or more base polyolefins. The grafting takes place in the presence of a free-radical generator, such as a peroxide. The hydrolysable silane monomer is grafted to the backbone of the base polyolefin(s) prior to incorporating or compounding the Si-g-PO into a final composition or simultaneously with the extrusion of composition to form a final article or composition. In an embodiment, the hydrolysable silane monomer is grafted to the backbone of the base polyolefin(s) prior to incorporating or compounding the Si-g-PO into a final composition.

The base polyolefin for the Si-g-PO may be an ethylene-based polymer, a propylene-based polymer, or a combination of an ethylene-based polymer and a propylene-based polymer. In an embodiment, the Si-g-PO includes two base polyolefins (i) a first amorphous polyolefin and (ii) a second amorphous polyolefin. An "amorphous polyolefin" (or "APO") is an ethylene-based polymer or a propylene-based polymer having a melt viscosity from 30 centipoise (cP) to 50,000 cP at 190° C. and a glass transition temperature (Tg) from −80° C. to 0° C.

The first APO is different than the second APO. In other words, the first APO differs in one or more chemical properties and/or one or more physical properties compared to the respective chemical property or physical property of the second APO. Nonlimiting examples of properties which may differ between the first APO and the second APO include composition, comonomer type, comonomer content, density, melt viscosity, Tg, softening point, and any combination thereof.

Within the Si-g-PO, the ratio of the first APO to the second APO is from 3:1 to 1:3, based on total weight of the Si-g-PO. In an embodiment, the ratio of the first APO to the second APO is from 3:1, or 2:1, or 1:1 to 1:2, or 1:3.

In an embodiment, the first APO is an ethylene-based polymer. In a further embodiment, the first APO is an APO ethylene/octene copolymer and has one, some, or all of the following properties:

(i) a density from 0.86 g/cc, or 0.87 g/cc, or 0.875 g/cc to 0.89 g/cc; and/or (ii) a Brookfield viscosity at 176.6° C. from 5,000 cP, or 6,000 cP to 10,000 cP, or 13,000 cP, or 15,000 cP, or 17,000 cP, or 19,000 cP, or 20,000 cP; and/or (iii) a Tm from 65° C., or 68° C. to 70° C., or 72° C.; and/or (iv) a Tg from −60° C., or −58° C. to −55° C., or −50° C., or −45° C.; and/or (v) a Tc from 55° C., or 57° C. to 60° C.

Nonlimiting examples of suitable APO ethylene-based polymer include AFFINITY GA 1875, AFFINITY GA 1900, AFFINITY GA 1950, and AFFINITY GA 1000R available from The Dow Chemical Company.

In an embodiment, the second APO is a propylene-based polymer, such as a propylene/ethylene copolymer or a propylene homopolymer. In a further embodiment, the second APO propylene-based polymer is an APO propylene/ethylene copolymer having one, some, or all of the following properties:

(i) a Brookfield viscosity at 190° C. from 200 cP, or 300 cP, or 500 cP, or 1,000 cP to 1,500 cP, or 3,000 cP, or 5,000 cP, or 7,500 cP, or 10,000 cP to 13,000 cP, or 15,000 cP, or 18,000 cP, or 20,000 cP; and/or (ii) a Ring and Ball softening point from 120° C., or 125° C., or 130° C. to 135° C., or 140° C., or 145° C.; and/or (iii) a Tg from −40° C., or −35° C., or −30° C. to −25° C., or −20° C., or −15° C.; and/or (iv) a Tc from 90° C., or 93° C. to 95° C.

In an embodiment, the second APO is a APO propylene homopolymer. The APO propylene homopolymer has one, some, or all of the following properties:

(i) a Brookfield viscosity at 190° C. from 500 cP, or 1,000 cP, or 1,500 cP to 2,000 cP, or 2,500 cP, or 3,000 cP; and/or (ii) a Ring and Ball softening point from 150° C., or 155° C. to 160° C.; and/or (iii) a Tg from −15° C., or −10° C. to −5° C.

Nonlimiting examples of suitable propylene-based APOs are EASTOFLEX™ amorphous polyolefins available from Eastman Chemical Company.

In an embodiment, the base polyolefin includes the first APO that is an ethylene-based APO and the second APO that is a propylene-based APO.

The hydrolysable silane monomer used to make the Si-g-PO is a silane-containing monomer (hereafter interchangeably referred to as a "silane") that will effectively copolymerize with an alpha-olefin (e.g., ethylene or propylene) to form an alpha-olefin/silane copolymer (e.g., an ethylene/silane copolymer or a propylene/silane copolymer) or graft to and crosslink an alpha-olefin polymer (e.g., a polyolefin) to form a Si-g-PO. Exemplary hydrolysable silane monomers are those having the following structure:

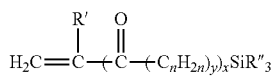

wherein R' is a hydrogen atom or methyl group;

x and y are 0 or 1 with the proviso that when x is 1, y is 1; n is an integer from 1 to 12 inclusive, or 1 to 4, and each R" independently is a hydrolysable organic group such as an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (alkylamino, arylamino), or a lower alkyl group having 1 to 6 carbon atoms inclusive, with the proviso that not more than one of the three R" groups is an alkyl.

Nonlimiting examples of suitable hydrolysable silane monomers include silanes that have an ethylenically unsaturated hydrocarbyl group, such as vinyl, allyl, isopropenyl, butenyl, cyclohexenyl or gamma-(meth)acryloxy allyl group, and a hydrolysable group, such as, for example, a hydrocarbyloxy, hydrocarbonyloxy, or hydrocarbylamino group. Examples of hydrolysable groups include methoxy, ethoxy, formyloxy, acetoxy, propionyloxy, and alkyl or arylamino groups.

In an embodiment, the hydrolysable silane monomer is an unsaturated alkoxy silane such as vinyl trimethoxy silane (VTMS), vinyl triethoxy silane, vinyl triacetoxy silane, gamma-(meth)acryloxy, propyl trimethoxy silane and mixtures of these silanes.

In an embodiment, the base polyolefin for the Si-g-PO includes the first APO that is an ethylene-based APO and the second APO that is a propylene-based APO. The ratio of first APO (ethylene-based APO) to the second APO (propylene-based APO) is from 3:1, or 2:1, or 1:1 to 1:2, or 1:3. Free radical initiation (peroxide) grafts the hydrolysable silane monomer to the first APO (ethylene-based APO) and also grafts the hydrolysable silane monomer to the second APO (propylene-based APO) to form the Si-g-PO. In other words, the hydrolysable silane monomer is grafted to the first APO and to the second APO. Bounded by no particular theory, the grafted polyolefin acts as a compatibilizing agent for the silicone oil in the final flooding composition, improving miscibility with the silicone oil.

In an embodiment, the ratio of the first APO (ethylene-based APO) to the second APO (propylene-based APO) present in the Si-g-PO is 1:1. The silane is VTMS. From 0.01 wt % to 0.05 wt % peroxide free radical initiator (generator) grafts the VTMS to the first APO and also grafts to VTMS to the second APO. The Si-g-PO has one, some, or all of the following properties:

(i) from 0.1 wt %, or 0.3 wt %, or 0.5 wt %, or 0.8 wt %, or 1.0 wt %, or 1.2 wt %, or 1.5 wt % to 1.8 wt %, or 2.0 wt %, or 2.3 wt %, or 2.5 wt %, or 3.0 wt % silane (based on total weight of the Si-g-PO); and/or (ii) a Brookfield viscosity at 176.6° C. from 2,000 cP, or 2,500 cP to 2,600 cP, or 2,700 cP, or 3,000 cP.

In an embodiment, the flooding composition and/or the Si-g-PO are/is void of, or are/is otherwise free of, butene.

The flooding composition and/or the Si-g-PO are/is void of, or are/is otherwise free of, polybutene, and/or polyisobutylene, for example.

In an embodiment, the flooding composition and/or the Si-g-PO are/is void of, or are/is otherwise free of, styrene or a composition containing a styrenic-based moiety. The flooding composition and/or the Si-g-PO are/is void of, or are/is otherwise free of, styrenic block copolymers, for example.

In an embodiment, the Si-g-PO consists of amorphous polyolefin composed only of, or otherwise composed solely of, (i) propylene monomer and (ii) ethylene monomer.

B. Polyα-Olefin Oil

The present flooding composition also includes a polyα-olefin oil. A "polyα-olefin oil" (or "PAO oil") is a synthetic compound produced by polymerizing at least one α-olefin and is a liquid at 22° C. and 1 atmosphere of pressure. The α-olefin may be any α-olefin, such as $C_2$, $C_6$, $C_8$, $C_{10}$, $C_{12}$, $C_{14}$, and $C_{20}$ α-olefins. Nonlimiting examples of suitable PAO oils include hydrogenated dec-1-ene homopolymer (e.g., DURASYN™ 180I and DURASYN™ 180R, available from INEOS) and hydrogenated 1-tetradecene polymer with 1-dodecene (e.g., DURASYN™ 126, available from INEOS).

The PAO oil has a kinematic viscosity of 1,500 centistokes ("cSt") or less at 40° C. In a further embodiment, the PAO oil has a kinematic viscosity at 40° C. from 1,000 cSt or less, or 500 cSt or less, or 200 cSt or less, or 100 cSt or less, or 50 cSt or less, or 10 cSt or less at 40° C. In an embodiment, the PAO oil has a kinematic viscosity from 10 cSt, or 15 cSt, or 20 cSt, or 30 cSt to 40 cSt, or 50 cSt, or 100 cSt, or 200 cSt, or 500 cSt, or 1,000 cSt, or 1,300 cSt, or 1,500 cSt at 40° C. Viscosity of the PAO oil is measured according to ASTM D445.

C. Polysiloxane

The present composition includes a polysiloxane. A "polysiloxane," as used herein, is an organosilicon compound with two or more Si—O—Si linkages. The polysiloxane may be (i) a polydimethylsiloxne (or "PDMS"), (ii) a hydroxyl-terminated polydimethylsiloxane (or "PDMS-OH"), and (iii) a combination of (i) and (ii).

In an embodiment, the polysiloxane is polydimethylsiloxane, hereafter interchangeably referred to as "PDMS." Polydimethylsiloxane has the Structure (1) below

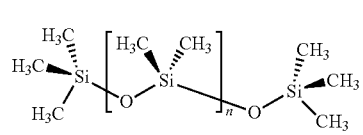

Structure (1)

wherein n is from 1, or 2, or 10, or 100, or 1,000 to 10,000, or 50,000, or 100,000.

In an embodiment, the PDMS has one, some, or all of the following properties:

(i) a number average molecular weight (Mn) from 1,000, or 2,000, or 3,000, or 3,200 to 3,500, or 4,000, or 5,000, or 7,000, or 10,000; and/or (ii) a viscosity (kinematic) at 25° C. from 20 cSt, or 30 cSt, or 40 cSt, or 50 cSt to 60 cSt, or 70 cSt.

Mn is measured by gel permeation chromatography (GPC), viscosity is measured using a BROOKFIELD viscometer (Model LVF, Spindle No. 4 at 12 revolutions per minute (rpm)), as described in U.S. Pat. No. 5,130,041.

A nonlimiting example of suitable PDMS includes, PMX 200 available from Dow Corning.

In an embodiment, the present flooding composition includes a hydroxyl-terminated polydimethylsiloxane. A "hydroxyl-terminated polydimethylsiloxane" (or "PDMS-OH") is a PDMS with terminal hydroxyl groups as shown in Structure 2 below:

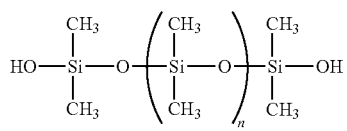

Structure (2)

wherein n is from 1, or 2, or 10, or 100, or 1,000 to 10,000, or 50,000, or 100,000.

In an embodiment, the PDMS-OH has one, some, or all of the following properties:

(i) a number average molecular weight (Mn) from 2,500, or 2,500 to 3,000, or 3,500, or 4,000; and/or (ii) a viscosity (kinematic) at 25° C. from 50 cSt, or 60 cSt, or 70 cSt, or 72 cSt to 80 cSt, or 90 cSt; and/or (iii) a hydroxyl group content in weight percent (wt %) based on the weight of the OH-PDMS from greater than 0 wt %, or 0.01 wt %, or 0.05 wt %, or 0.07 wt %, or 1.0 wt %, or 1.5 wt % to 2.0 wt %, or 2.5 wt %.

Mn is measured by gel permeation chromatography (GPC), viscosity is measured using a BROOKFIELD viscometer (Model LVF, Spindle No. 4 at 12 revolutions per minute (rpm)), as described in U.S. Pat. No. 5,130,041. Hydroxyl group content is measured by $^1$H NMR spectroscopy or other analytical techniques, similar to the approaches used in Malaysian Polymer Journal, Vol. 4, No. 2, p 52-61, 2009 and European Polymer Journal, Vol. 49, 228-234 (2013).

Nonlimiting examples of suitable PDMS-OH include, PMX-0156 from Dow Corning, and Q3563 from Dow Corning.

D. Catalyst

The present flooding composition includes a catalyst. The catalyst crosslinks the PDMS-OH by way of silanol condensation between the PDMS-OH and the grafted silane. Bounded by no particular theory, it is believed that the crosslinked PDMS-OH component, increases the melt viscosity of the final flooding composition, improves stability of the flooding composition, increases the drop point temperature, and reduces oil separation.

The catalyst may be added to the PDMS-OH prior to addition of the PDMS-OH to the other components. Alternatively, the catalyst and the PDMS-OH may be added simultaneously with the other components—namely with the Si-g-PO and the PAO oil.

Nonlimiting examples of suitable catalysts include metal carboxylates, such as dibutyltin dilaurate, stannous octoate, stannous acetate, lead naphthenate and zinc octoate; organic metal compounds, such as titanium esters and chelates such as tetrabutyl titanate; organic bases, such as ethylamine, hexylamine and piperidine; and acids, such as mineral acids and fatty acids, and aromatic sulphonic acids.

In an embodiment, the catalyst is an organic tin compound such as dibutyltin dilaurate, dibutyl dimethoxy tin, dibutyltin bis (2,4-pentanedionate), or stannous octoate. Examples of suitable commercial catalysts in masterbatch form include, without limitation, DFDB 5480NT (a tin catalyst system), DFDA 5488NT (a fast ambient cure catalyst masterbatch) from The Dow Chemical Company, or the Borealis AMBICAT™ system LE 4476.

In an embodiment, the catalyst is an aromatic sulphonic acid. A nonlimiting example of a suitable aromatic sulphonic acid is Aristonic® acid available from Pilot Chemical Holdings, Inc.

When the catalyst is present, the flooding composition contains from 0.05 wt %, or 0.1 wt %, or 0.15 wt % to 0.2 wt %, or 0.25 wt %, or 0.3 wt %, of the catalyst, based on total weight of the flooding composition. Curing of the flooding composition, crosslinks the PDMS-OH and the Si-g-PO, thereby increasing the viscosity of the flooding composition.

E. Additives

In an embodiment the flooding composition can optionally comprise one or more additives selected such as, but not limited to, antioxidants, rheology modifiers (e.g., thixotropic agents), thickening agents, stabilizers (e.g., UV stabilizers), mineral fillers, polymer fillers, and combinations thereof.

Antioxidants, when employed, can be present in any conventional amount, such as an amount ranging from 0.01 to 1 wt %, or from 0.01 to 0.3 wt %, based on the total weight of the flooding composition. Suitable antioxidants include, but are not limited to, hindered phenols such as tetrakis [methylene(3,5-di-tert-butyl-4-hydroxyhydrocinnamate)] methane; bis[(beta-(3,5-ditert-butyl-4-hydroxybenzyl)methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis (3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis (1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine antidegradants or stabilizers. In an embodiment, the antioxidant is [3-(3,5-di-tert-butyl-4-hydroxyphenyl)propionate], commercially available as IRGANOX™ 1035 or Irganox 1010 from BASF.

Thixotropic agents, when employed, can be present in any conventional amount, such as an amount ranging from greater than 0 to 5 wt %, or 6 wt %, based on the total weight of the flooding composition. An example of a suitable thixotropic agent includes, but is not limited to, fumed silica. Suitable commercial thixotropic agents include, but are not limited to, AEROSIL™ products from Evonik Corp. BYK Industries and Kusumoto Chemicals also supply suitable commercial thixotropic agents.

Nonlimiting examples of thickening agent, when employed, include Kraton™ polymer such as SEP(S), SBS, SEBS copolymers.

Nonlimiting examples of fillers, when employed, include inorganic fillers such as silica, calcium carbonate, and combinations thereof.

In an embodiment, the flooding composition can be free or substantially free of thixotropic agents. As used herein, the term "substantially free" shall mean a concentration of less than 10 parts per million by weight based on the total weight of the flooding composition.

In an embodiment, the flooding composition includes one or more fillers. Such fillers include, but are not limited to, hollow microspheres (e.g., glass or polymeric), mineral inorganic compounds, polymeric fillers, and the like. When employed, fillers can be present in any conventional amount, such as an amount ranging from greater than 0 up to 60 wt %.

F. Flooding Composition

The flooding composition is prepared by compounding the Si-g-PO, the PAO oil, the polysiloxane and the catalyst. For instance, the Si-g-PO, the PAO oil, and the polysiloxane and any optional additives can be compounded in a liquid operational mixer with temperature control. For instance, the ingredients can be compounded in a batch or continuous mixer. Suitable batch mixers include, but are not limited to, Banbury™, Silverson™, Dynamix™ tank mixers and agitators, and Littleford™ batch mixers. Continuous mixers include twin and single-screw extruders, Farrel™ mixers, and Buss™ co-kneaders.

The above-described Si-g-PO is present in the flooding compound in an amount ranging from 10 wt %, or 20 wt %, or 25 wt %, or 30 wt % to 35 wt %, or 40 wt %, or 45 wt % based on the total weight of the flooding component. Within the aforementioned Si-g-PO weight percent range, the ratio of the first APO to the second APO is from 3:1 to 1:3. The APO ratio is based on total weight of the Si-g-PO. In an embodiment, the ratio of the first APO to the second APO is from 3:1, or 2.5:1, or 2:1, or 1.5:1, or 1:1 to 1:1.5, or 1:2, or 1:2.5, or 1:3.

The above-described PAO oil is present in the flooding composition in an amount ranging from 5 wt %, or 10 wt %, or 20 wt %, or 30 wt % to 35 wt %, or 40 wt %, or 45 wt %, or 50 wt %, or 55 wt %, or 60 wt %, based on the total weight of the flooding composition.

The above-described polysiloxane is present in the flooding composition in an amount ranging from 15 wt %, or 20 wt % to 25 wt %, or 30 wt %, or 35 wt %, or 40 wt %, or 50 wt %, or 60 wt %, or 70 wt %, or 80 wt %, or 90 wt % based on total weight of the flooding composition.

The above-described catalyst is present in the flooding composition in an amount ranging from 0.05 wt %, or 0.1 wt %, or 0.15 wt % to 0.2 wt %, of the catalyst, based on total weight of the flooding composition.

It is understood that the individual amounts of (A) Si-g-PO, (B) PAO, (C) polysiloxane, and (D) catalyst add up to 100 wt % of the final flooding composition.

The resulting flooding composition has an apparent viscosity from 30 cP, or 50 cP, or 100 cP, or 200 cP, or 300 cP, or 400 cP, or 500 cP, or 750 cP, or 900 cP to 1,000 cP, or 1,100 cP, or 1,200 cP, or 1,300 cP, or 1,400 cP, or 1,500 cP, or 1,600 cP, or 1,700 cP, or 1,800 cP, as measured at 150° C. in accordance with ASTM D3236.

In an embodiment, the flooding composition has a drop point greater than or equal to 80° C., or 95° C., or 100° C., or 110° C., or 120° C., or 130° C. to 140° C., or 150° C., or 160° C., or 170° C., or 180° C., or 190° C. Drop point is determined according to ASTM D127.

In an embodiment, the flooding composition has an oil separation when aged for 24 hours at 21° C. of less than 0.1, or less than 0.05, or less than 0.01. In a further embodiment, the flooding composition has an oil separation when aged for 24 hours at 21° C. from 0, or greater than 0 to 0.01, or 0.05, or less than 0.1. In yet a further embodiment, the flooding composition has no (i.e., 0) oil separation when aged for 24 hours at 21° C. Oil separation is determined according to ASTM D1742.

In an embodiment, the flooding composition contains:
(A) from 25 wt %, or 30 wt % to 35 wt %, or 40 wt % of a Si-g-PO;
(B) from 30 wt %, or 35 wt % to 40 wt % of a PAO oil;
(Ci) from 20 wt %, or 25 wt % to 30 wt % of a PDMS;
(Cii) from 5 wt % to 10 wt % of a PDMS-OH; and
(D) from 0.1 wt %, or 0.15 wt % to 0.2 wt % of a catalyst
wherein the aggregate of components (A), (B), (Ci), (Cii), and (D) amount to 100 wt % of the flooding composition; and the flooding composition has one, some, or all of the following properties:
(i) an apparent viscosity (at 150° C.) from 250 cP, or 300 cP, or 500 cP, or 750 cP to 1,000 cP, or 1,250 cP, or 1,500 cP; and/or
(ii) a drop point from greater than or equal to 80° C., or 90° C., or 100° C., or 110° C. to 120° C., or 130° C., or 140° C., or 150° C.; and/or
(iii) an oil separation when aged for 24 hours at 21° C. from 0 to 0.01, or less than 0.1, and hereafter referred to as Compound1.

In an embodiment, the Compound1 Si-g-PO contains the first APO that is an APO ethylene-based polymer and the second APO that is an APO propylene-based polymer at a weight percent ratio of 1:1, based on the weight of the Si-g-PO.

In an embodiment, the flooding composition contains:
(A) from 35 wt %, or 40 wt % to 45 wt % of a Si-g-PO;
(B) from 50 wt %, or 55 wt % to 60 wt % of a PAO;
(C) from 30 wt %, or 35 wt % to 40 wt % of a PDMS-OH; and
(D) from 0.1 wt %, or 0.15 wt % to 0.2 wt % of a catalyst
wherein the aggregate of components (A), (B), (C) and (D) amount to 100 wt % of the flooding composition; and the flooding composition has one, some, or all of the following properties:
(i) an apparent viscosity (at 150° C.) from 250 cP, or 275 cP to 300 cP; and/or
(ii) a drop point from 120° C., or 130° C. to 140° C., or 150° C.; and/or
(iii) an oil separation when aged for 24 hours at 21° C. from 0 to 0.01, or less than 0.1; and hereafter referred to as Compound1.

In an embodiment, the Compound1 Si-g-PO contains the first APO that is an APO ethylene-based polymer and the second APO that is an APO propylene-based polymer at a weight percent ratio of 1:1, based on the weight of the Si-g-PO.

In an embodiment, the flooding composition contains:
(A) from 5 wt %, or 10 wt % to 15 wt %, of a Si-g-PO;
(B) from 5 wt %, or 10 wt % to 15 wt %, or 20 wt % of a PAO oil;
(C) from 65 wt %, or 70 wt %, or 75 wt % to 80 wt %, or 85 wt % of a PDMS-OH; and
(D) from 0.1 wt % to 0.15 wt %, or 0.2 wt % of a catalyst;
wherein the aggregate of components (A), (B), (C) and (D) amount to 100 wt % of the flooding composition;
and the flooding composition has one, some, or all of the following properties:
(i) an apparent viscosity (at 150° C.) from 40 cP, or 50 cP, or 100 cP, or 200 cP, or 300 cP, or 400 cP to 500 cP, or 600 cP, or 700 cP, or 800 cP; and/or
(ii) a drop point from 110° C., or 120° C., or 140° C., or 150° C. to 160° C., or 170° C., or 180° C., or 190° C.; and/or
(iii) an oil separation when aged for 24 hours at 21° C. from 0 to 0.01, or less than 0.1; and hereafter referred to as Compound3.

In an embodiment, the Compound3 Si-g-PO contains the first APO that is an APO ethylene-based polymer and the second APO that is an APO propylene-based polymer at a weight percent ratio of 1:1, based on the weight of the Si-g-PO.

G. Fiber Optic Cable

In an embodiment, a fiber optic cable, also known as an optical fiber cable, can be prepared that comprises at least one optical fiber, a plurality of buffer tubes, and the above-described flooding composition.

A cross-sectional view of a common loose-buffer-tube optical fiber cable is shown in FIG. 1. In this design of optical fiber cable 1, buffer tubes 2 are positioned radially around a central strength member 4, with a helical rotation to the tubes in the axial length. The helical rotation allows bending of the cable without significantly stretching the tube or the optic fibers 6.

If a reduced number of buffer tubes is required, then foamed filler rods can be used as low-cost spacers to occupy one or more empty buffer tube positions 10 to maintain cable geometry. The cable jacket 14 can generally be fabricated from a polyethylene-based material.

The above-described flooding composition can be used to fill the void spaces 8 surrounding optic fibers 6 within buffer tubes 2. Additionally, the flooding composition can be used to fill void spaces surrounding and between the buffer tubes 2, but within the cable jacket 14. The flooding composition provides the suspension and protection needed in the immediate environment surrounding the fibers, including eliminating air space. The flooding composition also provides a barrier against water penetration, which is detrimental to optic transmission performance.

Many other buffer tube cable designs are possible. The size and materials of construction for the central strength and tensile member, the dimensions and number of buffer tubes, and the use of metallic armors and multiple layers of jacketing material are among the design elements. Such designs that incorporate a flooding composition are contemplated within the scope of the present disclosure.

In an embodiment, the buffer tubes are formed from polypropylene copolymer (cPP) (such as ESCORENE™ 7132, an impact copolymer available from Exxon Chemical Company).

In an embodiment, the cable jacket is formed from a high density polyethylene (HDPE) (such as DGDA-6318BK, available from The Dow Chemical Company, having a density of 0.954 g/cm³). A "high density polyethylene" (or "HDPE") is an ethylene-based polymer having a density of at least 0.94 g/cc, or at least 0.94 g/cc to 0.98 g/cc. The HDPE has a melt index from 0.1 g/10 min to 25 g/10 min, measured in accordance with ASTM D1238, condition 190° C./2.16 kg.

An optical fiber cable, such as those described above, can typically be made in a series of sequential manufacturing steps. Optical transmission fibers are generally manufactured in the initial step. The fibers can have a polymeric coating for mechanical protection. These fibers can be assembled into bundles or ribbon cable configurations or can be directly incorporated into the cable fabrication.

Optical protective components can be manufactured using an extrusion fabrication process. Typically, a single screw plasticating extruder discharges a fluxed and mixed polymer under pressure into a wire and cable cross-head. The cross-head turns the melt flow perpendicular to the extruder and shapes the flow into the molten component. For buffer and core tubes, one or more optic fibers or fiber assemblies and flooding composition are fed into the back of the cross-head and exit the cross-head within the molten tube that is then cooled and solidified in a water trough system. This component is eventually collected as a finished component on a take-up reel.

To fabricate components made from two or more material layers, there typically would be separate plasticating extruders feeding the melt compositions into a multi-layer cross-head where it is shaped into the desired multi-layer construction.

Slotted core members and other profile extrusion components are typically extruded in a similar profile extrusion process incorporating an appropriate shaping die, and then subsequently combined with the optical fiber components to fabricate the finished cable.

To control excess fiber length, a tensioning system is used to feed the fiber components into the tube fabrication process. In addition, component materials selection, the tube extrusion and cross-head equipment, and processing conditions are optimized to provide a finished component where post extrusion shrinkage does not result in excessive slack in the optic fiber components.

The extruded optical protective components, along with other components such as central components, armors, wraps, are then subsequently processed in one or more steps to produce the finished cable construction. This typically includes processing on a cabling line where the components are assembled with a fabricating extruder/crosshead then used to apply the polymeric jacketing.

By way of example, and not limitation, some embodiments of the present disclosure will now be described in detail in the following Examples.

Examples

Materials used in the comparative samples (CS) and the inventive examples (1E) are provided in Table 1 below.

TABLE 1

Materials and Properties

| Component | Specification/Properties | Source |
| --- | --- | --- |
| AFFINITY ™ GA 1875 APO ethylene-based polymer (1st APO) | ethylene/1-octene copolymer crystallinity = 21.7 wt % Brookfield Viscosity = 6,700 cP (@176.6° C.) $M_n$ = 7,210 $C_2$ wt % = 63.7 wt % | density = 0.870 g/cc $T_g$ = −57° C. $T_m$ = 70° C. The Dow Chemical Company |
| EASTOFLEX ™ P1010 APO propylene homopolymer (2nd APO) | amorphous propylene homopolymer (hPP) Brookfield Viscosity = 1,000 cP (@190° C.) Ring and Ball softening point 155° C. | $T_g$ = −10° C. Eastman |
| Vinyltrimethoxy-silane (VTMS) (silane) | Mol wt. = 148.23 g/mol 0.968 g/cc | Sigma-Aldrich |
| L101 peroxide | Colorless to light yellow liquid Mol wt. = 290.44 g/mol Formula: C16H34O4 | Akzo Nobel |
| PMX-0156 Silanol fluid (also known as Q3563) PDMS—OH | Mn = 3500 g/mol Flash point 117.7° C. (closed cup) Relative density = 0.975 g/cc Brookfield Viscosity at 25° C. = 72 cSt Hydroxyl ≤2.5% | Dow Corning |
| PMX 200 PDMS oil | Viscosity 50 cSt at 25° C. Flash point >326° C. open cup Pour point −65° C. Mn = 3200 Density 0.96 g/cc | Dow Corning |

TABLE 1-continued

Materials and Properties

| Component | Specification/Properties | Source |
|---|---|---|
| Durasyn 126 PAO oil | 0.827 g/cc density Viscosity at 40° C. is 30.6 cSt Mn = 575 Flash pt = 254° C. (open cup) Pour pt = −39° C. | INEOS |
| Aristonic Acid | Aromatic sulphonic acid catalyst Flash pt >113° C. (closed cup) Pour pt 28° C. Viscosity 13.9 cSt at 50° C. | Pilot Chemical |
| Dibutyltin dilaurlate (DBTL) | Tin catalyst Density 1.066 g/cc Mol wt. = 631.56 g/mol liquid | Sigma Aldrich |

1. Preparation of Si-g-PO

The materials used to produce the silane-grafted polyolefin (Si-g-PO) are provided in Table 2 below:

TABLE 2

| Materials | |
|---|---|
| Affinity GA 1875 | 48.725 |
| P1010 (Eastman) | 48.725 |
| VTMS (sigma-aldrich) | 2.500 |
| L101 (Peroxide) | 0.050 |
| Total (wt %) | 100.000 |
| Brookfield Visc. 176.6° C. (cP) | 2674 |

Table 2 above shows the components and amounts used to prepare the silane-grafted polyolefin.

The materials in Table 2 are weighed and placed into a glass jar and preheated in an oven at 40° C. for 2 hours. The VTMS and L101 mixture are added to the glass jar containing the pre-weighed/preheated resins. A screw cap is placed on the jar and the sealed jar is tumbled for 2 hrs at 60° C. until the pellets are visibly dry. The jar is placed back in the oven after tumbling (at 40° C.). The soaked pellets are placed into a beaker and melted by heating to 130° C. The materials are mixed for 15 minutes at 185-190° C. at 45 rpm. The hot material is placed between Mylar® sheets into a compression molding press set at room temperature under high pressure for 10 minutes to flatten out. The material is placed into moisture bags for later use. The Brookfield viscosity is measured at 176.6° C. The resins are melt mixed together at 160° C. The Brookfield viscosity of the resultant Si-g-PO is shown in Table 2.

2. Preparation of Flooding Composition

The Si-g-PO resin described in Table 2 is used as the base resin to produce the flooding compositions shown in Table 3. The DBTDL or Aristonic acid catalysts are mixed into the polysiloxane fluid at room temperature for about 5 minutes using a three bladed lab stirrer to ensure even distribution before reacting.

The resins are heated and melted in steel paint cans on a hot plate equipped with a three blade overhead lab stirrer. The resins are heated to 160-170° C. while stirring and then allowed to cool to 100° C. The oils used in the formulation are then added to the mixture along with the polysiloxane fluid/catalyst mixture while stirring. The mixture is then heated to 180-190° C. for 15 minutes while stirring.

Properties of comparative samples (CS) and inventive examples (IE) are shown in Table 3 below.

TABLE 3

| Components | CS2 | CS3 | CS4 | CS5 | CS6 | CS7 | CS8 | CS9 | CS10 | IE1 |
|---|---|---|---|---|---|---|---|---|---|---|
| Step 2-Final Blend | | | | | | | | | | |
| AFFINITY ™ GA 1875 | | | | | | | | | | |
| EASTOFLEX ™ P1010 | | | | | | | | | | |
| Grafted Resin (Table 1, Sample 1) | | | | 10 | 29.85 | 39.85 | 29.85 | 29.85 | 29.85 | 29.85 |
| PMX-0156 (Q3563) (PDMS—OH) | 100 | 99.85 | 99.85 | 89.85 | 70 | 60 | 30 | 20 | 10 | 10 |
| PMX 200 −50 cSt (PDMS)) | | | | | | | 30 | 30 | 40 | 20 |
| Durasyn 126 (PAO Oil) | | | | | | | 10 | 20 | 20 | 40 |
| Dibutyltin dilaurate (DBTDL) | | 0.15 | | | | | | | | |
| Aristonic Acid | | | 0.15 | 0.15 | 0.15 | 0.15 | 0.15 | 0.15 | 0.15 | 0.15 |
| Total (wt %) | 100 | 100 | 100 | 100 | 100 | 100 | 100 | 100 | 100 | 100 |
| Brookfield viscosity at 100° C. (cP)[2] | 10.6 | 11.3 | 4010 | 156 | | | | | | |
| Brookfield viscosity at 150° C. (cP)[2] | | | 954 | | 310 | | Too High | 165.20 | 1518 | 250 |
| Drop Point (° C.)[2] | N/A | N/A | N/A | >210 | >210 | N/A | | | | 80 |
| Consistency[3] | | | | R | | | | | | P |
| Oil Separation[4] | | | N | S | Y | Y | Y | Y | Y | N |

TABLE 3-continued

| Components | CS11 | IE2 | CS12 | CS13 | IE3 | IE4 | CS14 | CS15 | CS16 | IE5 |
|---|---|---|---|---|---|---|---|---|---|---|
| Step 2-Final Blend | | | | | | | | | | |
| AFFINITY ™ GA 1875 | | | | | | | 20 | | | |
| EASTOFLEX ™ P1010 | | | | | | | 20 | | | |
| Grafted Resin (Table 1, Sample 1) | 29.85 | 29.85 | 30 | 39.92 | 39.6 | 39.85 | | 39.85 | 40 | 40 |
| PMX-0156 (Q3563) (PDMS—OH) | 10 | 5 | 5 | 5 | 5 | 5 | 5 | | 5 | 5 |
| PMX 200 -50 cSt (PDMS)) | 30 | 30 | 64.85 | 25 | 25 | 25 | 25 | 25 | 25 | |
| Durasyn 126 (PAO Oil) | 30 | 35 | | 30 | 30 | 30 | 29.85 | 35 | 30 | 54.85 |
| Dibutyltin dilaurate (DBTDL) | | | | | | | | | | |
| Aristonic Acid | 0.15 | 0.15 | 0.15 | 0.08 | 0.4 | 0.15 | 0.15 | 0.15 | | 0.15 |
| Total (wt %) | 100 | 100 | 100 | 100 | 100 | 100 | 100 | 100 | 100 | 100 |
| Brookfield viscosity at 100° C. (cP)[2] | | | | | | | | | | |
| Brookfield viscosity at 150° C. (cP)[2] | 609 | 545 | >1300 | 695 | 1120 | 1440 | 640 | 522 | 660 | 264 |
| Drop Point (° C.)[2] | | 80 | | | 150 | 80 | | | | 150 |
| Consistency[3] | | P | | | P | P | | | | P |
| Oil Separation[4] | Y | N | Y | Y | N | N | Y | Y | Y | N |

| Components | CS17 | CS18 | CS19 | CS20 | IE6 | IE7 | IE8 |
|---|---|---|---|---|---|---|---|
| Step 2-Final Blend | | | | | | | |
| AFFINITY ™ GA 1875 | | | | | | | |
| EASTOFLEX ™ P1010 | | | | | | | |
| Grafted Resin (Table 1, Sample 1) | 40 | 49.85 | 39.85 | 29.85 | 10 | 10 | 10 |
| PMX-0156 (Q3563) (PDMS—OH) | 5 | 5 | 30 | 40 | 84.85 | 79.85 | 69.85 |
| PMX 200 -50 cSt (PDMS)) | 54.85 | 45 | 30 | 30 | | | |
| Durasyn 126 (PAO Oil) | | | | | 5 | 10 | 20 |
| Dibutyltin dilaurate (DBTDL) | | | | | | | |
| Aristonic Acid | 0.15 | 0.15 | 0.15 | 0.15 | 0.15 | 0.15 | 0.15 |
| Total (wt %) | 100 | 100 | 100 | 100 | 100 | 100 | 100 |
| Brookfield viscosity at 100° C. (cP)[2] | | | | | | | |
| Brookfield viscosity at 150° C. (cP)[2] | 1180 | 52200 | | 1400 | 40 | 600-800 | 368 |
| Drop Point (° C.)[2] | N | N | N | | 200 | 110 | 110 |
| Consistency[3] | | | | | P | P | P |
| Oil Separation[4] | Y | Y | Y | Y | N | N | N |

CS = Comparative Sample
IE = Inventive Example
[1]Component amounts are wt % based on total weight composition.
[2]Apparent viscosity of the composition is measured in accordance with ASTM D3236 at 150° C. (1 cps = 1 cP).
[3]Consisency of the composition is visually determined while the composition is at 21° C. P = Paste. S = Solid. W = Waxy. H = Hard. R = Rubbery
[4]Oil separation is measured after aging for 24 hours at 21° C. according to ASTM D1742. Y = Yes. S = Slight. VS = Very Slight. N = None. O = Oil Separation.
[5]Drop Point (° C.) is measured in accordance ASTM D127

The first three samples in Table 3 (CS2, CS3, CS4) show the effect the catalyst has on the viscosity of the PDMS-OH fluid. The catalyst containing PDMS-OH fluid in CS2 and CS3 are made by mixing the catalyst into the PDMS-OH fluid at room temperature first and then heating to 180-190° C. for 15 minutes while stirring. CS3 shows that the DBTDL catalyst has no effect on the viscosity under the reaction conditions used here. However, CS4 shows that sulphonic acid catalyst imparts an increase in viscosity after the heating step. Therefore the sulphonic acid catalyst is used in the remaining formulations shown in Table 3.

The flooding compositions are considered successful (good) when no oil separation occurs and the final product is a soft stable gel or paste having a Brookfield viscosity in the range of 30-1,800 cP at 150° C.

CS5 with about 90 wt % PDMS-OH shows no oil separation however the sample is quite rubbery in consistency. CS7 shows that 60 wt % polysiloxane fluid with about 40% grafted resins has oil separation.

CS19 indicates that when 30 wt % PDMS plus 30% PDMS-OH (total 60% silicone fluids) is used in a formulation the typical result is product with oil separated from the polymer and no stable gel is formed. A similar result occurs in CS17 with about 55 wt % PDMS oil (total 60 wt % silicone fluids) and CS18 with 50% silicone fluids. As the amount of Si-g-PO resin is increased from 40 to 50 wt % in CS18, the viscosity is greatly increased and oil separation still occurs in the final product.

IE2 shows that 30 wt % PDMS oil used in combination with the PAO and 5 wt % PDMS-OH fluid (PMX-0156)/30 wt % silicone oil and catalyst in the formulation produces a stable soft gel with no oil separation and still maintains a low viscosity (545 cP) at 150° C. IE4 shows that a stable gel with no oil separation with 60 wt % total oil content (and 30 wt % total silicone fluids) and the same components at different levels as IE1 also produce a stable gel with no oil separation and maintain a low viscosity (250 cP) at 150° C. IE1 and IE4 each show no oil separation, each maintains low viscosity and each achieves a drop point of 80° C.

CS13 is similar to IE3 and IE4 but has a lower level of aristonic acid which shows oil separation indicating that CS13 is unacceptable.

CS14, CS15 and CS16 support the need for each component in the IE3 and IE4 examples in that oil separation occurs in each case for CS14, CS15 and CS16 when one component in IE4 is removed.

IE6, IE7, IE8 show that high amounts of PDMS-OH (70-85 wt %) can be used and achieve stable gels.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A flooding composition comprising in weight percent (wt %) based on the weight of the composition:
   (A) from 10 wt % to 45 wt % of a silane-grafted polyolefin (Si-g-PO);
   (B) from 5 wt % to 60 wt % of a polyα-olefin oil (PAO oil);
   (C) from 15 wt % to 90 wt % of a polysiloxane; and
   (D) from 0.05 wt % to 0.2 wt % of a catalyst.

2. The flooding composition of claim 1 wherein the Si-g-PO comprises two base polyolefins of an ethylene-based polymer and a propylene-based polymer.

3. The flooding composition of claim 2 wherein the Si-g-PO comprises a first amorphous polyolefin (APO) that is an APO ethylene-based polymer and a second APO that is an APO propylene-based polymer.

4. The flooding composition of claim 3 wherein the weight ratio of the first APO ethylene-based polymer to the second APO propylene-based polymer is from 3:1 to 1:3 based on total weight of the Si-g-PO.

5. The flooding composition of claim 1 wherein the polysiloxane is selected from the group consisting of polydimethylsiloxane (PDMS), hydroxyl-terminated polydimethylsiloxane (PDMS-OH), and combinations thereof.

6. The flooding composition of claim 1 wherein the flooding composition has an apparent viscosity from 30 cP to 1,800 cP at 150° C., as measured in accordance with ASTM D3236.

7. The flooding composition of claim 6 having a drop point greater than or equal to 80° C., as measured in accordance with ASTM D127.

8. The flooding composition of claim 7 comprising
   (A) from 25 wt % to 40 wt % of the Si-g-PO;
   (B) from 30 wt % to 40 wt % of the PAO oil;
   (Ci) from 20 wt % to 30 wt % of a PDMS;
   (Cii) from 5 wt % to 10 wt % of a PDMS-OH; and
   (D) from 0.1 wt % to 0.2 wt % of the catalyst
   wherein the flooding composition has an apparent viscosity from 250 cP to 1,500 cP.

9. The flooding composition of claim 8 wherein the flooding composition
   has a drop point from greater than or equal to 80° C. to 150° C.; and
   has no oil separation when aged for 24 hours at 21° C. as measured in accordance with ASTM D1742.

10. The flooding composition of claim 7 comprising
    (A) from 35 wt % to 45 wt % of the Si-g-PO;
    (B) from 50 wt % to 60 wt % of the PAO oil;
    (C) from 5 wt % to 10 wt % of a hydroxyl-terminated polydimethyl siloxane; and
    (D) from 0.1 wt % to 0.2 wt % of the catalyst
    wherein the flooding composition has an apparent viscosity from 250 cP to 300 cP.

11. The flooding composition of claim 10 wherein the flooding composition
    has a drop point from 120° C. to 150° C.; and
    has no oil separation when aged for 24 hours at 21° C. as measured in accordance with ASTM D1742.

12. The flooding composition of claim 7 comprising
    (A) from 5 wt % to 15 wt % of the Si-g-PO;
    (B) from 5 wt % to 20 wt % of the PAO;
    (C) from 65 wt % to 85 wt % of a PDMS-OH; and
    (D) from 0.1 wt % to 0.2 wt % of the catalyst
    wherein the flooding composition has an apparent viscosity from 40 cP to 800 cP.

13. The flooding composition of claim 12 wherein the flooding composition
    has a drop point from 110° C. to 190° C.; and
    has no oil separation when aged for 24 hours at 21° C. as measured in accordance with ASTM D1742.

14. An fiber optic cable comprising:
    a buffer tube;
    at least one optical fiber in the buffer tube; and
    a flooding composition comprising in weight percent (wt %) based on the weight of the composition:
    (A) from 10 wt % to 40 wt % of a silane-grafted polyolefin (Si-g-PO);
    (B) from 5 wt % to 60 wt % of a polyα-olefin oil (PAO oil);

(C) from 15 wt % to 90 wt % of a polysiloxane; and
(D) from 0.05 wt % to 0.2 wt % of a catalyst.

* * * * *